Patented Feb. 18, 1941

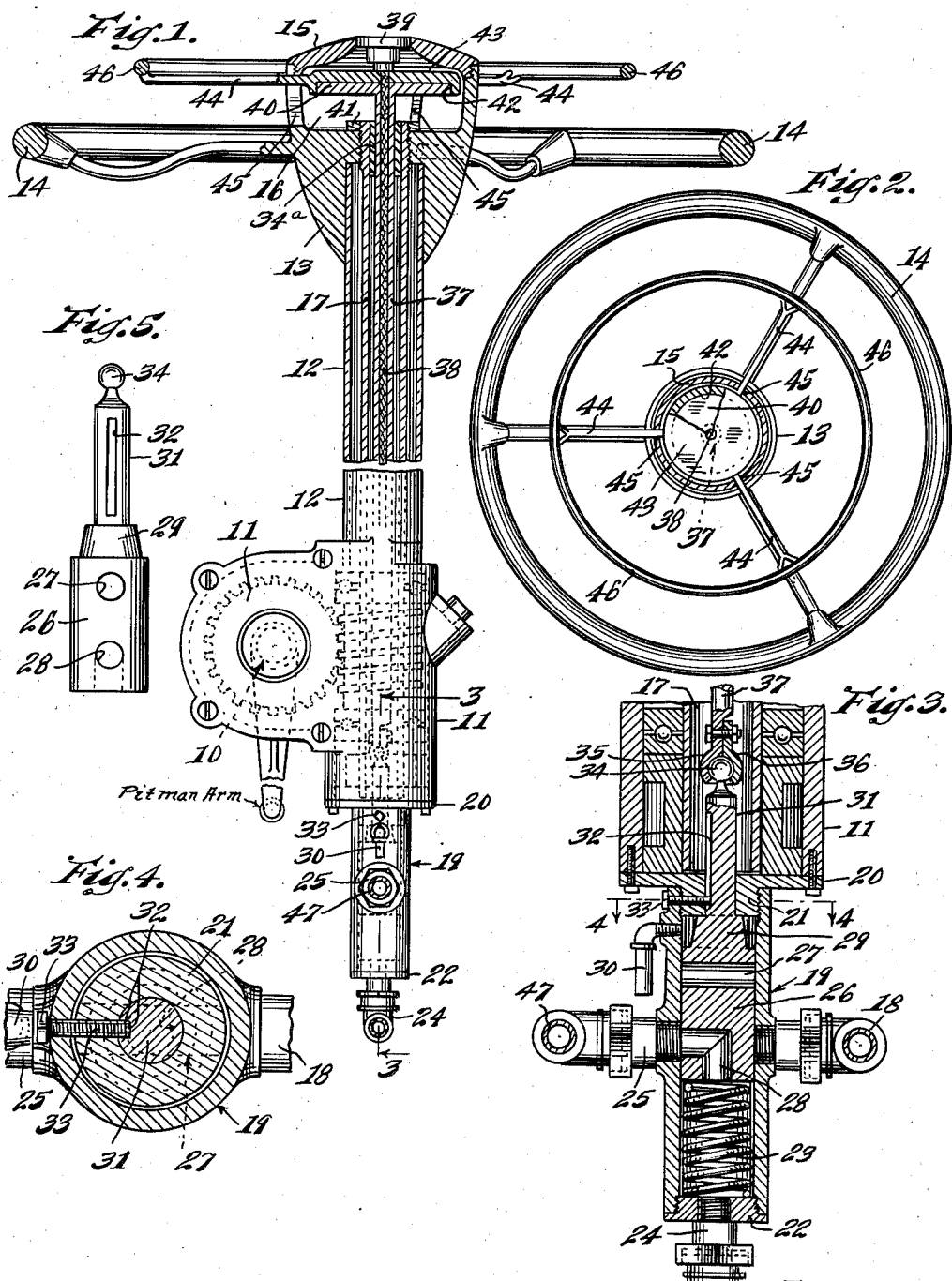

2,232,529

UNITED STATES PATENT OFFICE 2,232,529

CONTROL VALVE FOR FLUID PRESSURE BRAKES

Harold Holk, Chicago, Ill.

Original application February 13, 1939, Serial No. 256,065, now Patent No. 2,227,584, dated January 7, 1941. Divided and this application June 12, 1939, Serial No. 278,732

8 Claims. (Cl. 188—152)

This invention relates to fluid pressure brakes for vehicles and particularly automobiles, adapted especially to be operated by air pressure under delicate control absolutely by the operator or driver of a car and is what I term a finger touch air brake and is a division of my prior application, Serial No. 256,065, filed February 13, 1939, now Patent No. 2,227,584, Jan. 7, 1941.

The invention embodies a novel brake control valve for a fluid pressure brake structure applied to the wheels and embodying conical or interfitting tapered circular drums and shoes co-acting therewith and adapted to be forced by air pressure into braking position, but automatically released or retracted to an inoperative position upon release of the control means.

The invention not only consists in a novel assembly and structure of air brake system, particularly with respect to its application to all four wheels of an automobile, but also in a novel control means and valve therefor mounted in the steering column axially and capable of convenient and minute control by means of a ring mounted on the steering column or post in convenient position for operation by the fingers to any position around the wheel and without in the least interfering with the driving operations.

Other objects and advantages will be brought out more fully in the following specification, reference being had to the drawing, in which:

Fig. 1 is a sectional elevation of the steering post or column with operative connections to brakes.

Fig. 2 is a plan view of the steering wheel and column, partly in section;

Fig. 3 is an enlarged vertical section showing the operative connections with the control valve taken on the line 3—3 of Fig. 1;

Fig. 4 is a section taken on the line 4—4 of Fig. 3; and

Fig. 5 is an elevation of the valve plunger or head.

Referring more particularly to the drawing, the device is adapted for application to a chassis and brakes such as shown and described in my copending application above referred to, with a fluid pressure supply means such as described with an air or other fluid pressure reservoir. The steering gear includes the usual pitman arm of the steering gear having connection with the shaft 10 of the steering gear 11, usually of the worm gear type as indicated in dotted lines in Fig. 1 and suitably bolted to or mounted on a side of the vehicle frame or chassis not shown.

The steering gear column or post in the form of a hollow tubular member is designated at 12 and rotatably supports the hub 13 of the steering wheel 14, the hub 13 having a removable top portion or threaded cap member 15 closing a large cavity 16 in the top of the hub 13 through which certain operating parts are inserted and having a bottom bore or cavity receiving the column so that the wheel may turn thereon. The steering wheel hub 13 is fixed to a tubular shaft 17 which is in turn fixed to the steering gear 11.

A pressure supply line 18 leads from the reservoir such as shown in my prior application, Serial No. 256,065, filed February 13, 1939, as hereinbefore referred to and is connected to the inlet of a control valve 19 consisting of a casing shown in the form of a cylinder with the upper end internally threaded to connect with the bottom plate 20 of the gear housing 11 through the medium of an externally threaded depending flange 21, although any other suitable form of air tight connection may be employed with suitable interposed packing if found desirable or necessary. This connection may be considered in the form of a flanged collar, the part 21 being the collar and the part 20 a flange on the collar bolted as shown in Fig. 3 or otherwise suitably connected to the bottom end of the housing of the worm gear 11 with suitable interposed packing, if desired. A plug 22 is threaded or otherwise connected to the lower end of the cylinder and is in the form of a flanged collar and provided with a small central bore around which an expansible spring 23 is supported, the lower end of the spring bearing on the plug and an exhaust connection 24 being connected to the plug leading to the atmosphere for exhausting the brake line, as will be later described. In addition to the inlet of the pressure line 18 at one side of the cylinder, an outlet 25 is provided at the diametrically opposite side for cooperation with a plunger 26 in the form of a cylindrical piston operating in the cylinder and having a diametrical passage 27 near its upper end and an L-shaped passage 28 near its lower end and adapted to register at times with the outlet 25, while the lower end extends into the chamber or housing of the spring 23. The top of the plunger has a reduced or frusto-conical portion 29 forming an annular chamber around it within the cylinder provided with an exhaust 30 to prevent the formation of a dash pot above the plunger within the cylinder and beneath the shoulder formed by the collar or flange 21 with which the top of the frusto-conical portion 29 engages by the shoulder thus formed at the top of portion 29 to limit the upward stroke of the plunger. The shoulder is formed at the top of portion 29 by a reduced stem 31 on the plunger extending upwardly snugly through and splined to the collar or flange 21 as by means of a slot 32 longitudinally of the stem periphery and engaged by a key, screw or pin 33 extending through the wall of the cylinder of the control valve 19 and collar or flange 21 and into the slot or groove 32 as seen in Fig. 3 to prevent the plunger from turning, but still permit free axial movement or reciprocation thereof so that the passage 27 may be simultaneously registered with the inlet 18 and the outlet 25 at the downward position or limit of the plunger valve or piston 26 and the passage 28 moved into and out of registration with the outlet 25 at times, depending upon the position of the plunger, but particularly when the latter is in its normal or upward position under the action of the spring 23.

Means is provided for connecting the upper end of the stem and thus the plunger 26 with a suitable operating means having connection therewith and mounted on the steering column and wheel of the automobile or other vehicle and shown in the form of a ball and socket swivel joint or other separable connection or universal joint having a ball 34 on a reduced portion at the upper end of the stem received in a socket 35 shown having a split connection 36 to facilitate assembly, although any other suitable form of connection may be employed with the lower end of a hollow valve rod 37 positioned in the center of the steering column or post 12 and adapted to take the wiring 38 leading to the usual warning signal or horn operated from a button switch 39 at the top of the hub of the steering wheel. The tubular rod 37 is also positioned within the tubular shaft 17 fixed to one of the gears of the worm gear 11 and rigidly connected to the hub 13 by means of an interposed web or plate formed above the bottom cavity of the hub which receives the post 31 on which it turns. A threaded connection is illustrated in Fig. 1 with a clamping nut 41 at the top of the tubular shaft 17 and an interposed bronze bushing 34a bearing rod 37.

A disc 40 fits loosely in a socket 42 to swivel or turn in the bottom of a flanged plate 43, which parts together with the upper end of the tubular shaft 17 and the clamping nut are accommodated within an enlarged cavity 16 in the top of the hub provided with a central opening for the switch button or plate 39 of the horn. The flanged plate or disc 43 may be considered as having a peripheral depending flange receiving or fitting over the disc 40 and is provided with a plurality of lateral radial arms or spokes 44, preferably three in number equidistantly spaced above the spokes of the steering wheel 14 and operating in vertical slots 45 in the hub 13 communicating with the cavity 16. A ring or rim 46 in conjunction with the arms 44 form an operating wheel adapted to be depressed while gripping the steering wheel by pressing the same with a finger at either side with a minimum of pressure which may be regulated according to the braking pressure which may be required to stop or check the momentum of the vehicle depending upon its speed or velocity and is conveniently smaller than the steering wheel.

A distributing line or pipe 47 is connected to the outlet 25 of the control valve 19 and connects at its end with the brake operating means at each wheel such as in the manner described in my copending application, for operation of the brakes as described therein.

In the operation of the device, normally, the brakes are released and this is due to the automatic action of the control valve which places the L-passage thereof in communication with the air lines from the valve to the various wheels while cutting off the supply of air and connecting said lines to an exhaust outlet which may be led to any convenient position beneath the car. The particular type of air valve and controlling means in the form of a repressible ring adjacent the steering wheel capable of delicate control for causing sudden or very gradual braking operation upon depression of the ring to operate the control valve plunger 26 for admitting air from the compressed air reservoir through the valve and by air lines to the brakes in order to cause the movable brake shoes to engage the drums and bring about a braking action, is particularly desirable and advantageous. The valve is so constructed that the amount of air admitted to the brakes may be regulated to a nicety by the degree of pressure upon the operating ring and rod controlling the valve.

The compressor is operated as described to maintain the car brake operating pressure in the reservoir which is governed and released of any excess pressure. The pipe line 18 carries this pressure to the control valve which normally cuts off the air or fluid pressure from the brakes. Thus, by repressing the operating ring on the steering wheel and the rod connecting the same to the valve plunger, the latter may be depressed any desired degree so that the diametrical passage will be aligned with the pipes 18 and 25 to admit air to the pipe 47.

Immediately upon release of the pressure on the ring under touch control of the operator or driver, the springs 23 will return the plunger to a normal position wherein the passage 27 will be raised out of alignment with the pipes constituting the inlet 18 and outlet 25. The action of the spring 23 may be regulated by adjustment of the plug 22 and when the plunger is so raised, the angular or L-shaped passage 28 by registering with the outlet 25 leading to the pipe lines and brake shoes or cylinders thereof, will be placed in communication with the exhaust 24, thus permitting the air to be exhausted from the cylinders in front of the pistons and the pipe lines in returning the brake shoes and associated parts to normal disengaged positions.

Attention is also directed to the fact that the slot 32 and the key or screw 33 constituting the splined connection between the plunger 26 and its cylinder, serves to limit the throw or degree of movement of the plunger in addition to preventing rotational movement thereof, insuring registration of the passages or ports of the plunger with the inlet, outlet and exhaust, respectively.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. In an air pressure brake control for air pressure brakes, a control valve including a cylindrical casing having an inlet connection with a pressure supply line and an outlet connection leading to the brakes, a plunger movable in the casing and having a diametrical passage for connecting the inlet and outlet upon depression of the plunger and an elbow passage for connecting the outlet with the bottom of the casing, adjustable spring means in the bottom of the casing for holding the valve in the last named position, said casing having an exhaust at the bottom, a collar secured in the upper end of the cylinder and adapted for connection with the lower end of a steering gear assembly at the lower end of a steering wheel column, said plunger having a reduced upper portion and a further reduced stem movable through the collar and held against turning, there being a shoulder at the upper end of the reduced portion around the stem to engage the collar and limit the upward stroke of the plunger, an exhaust leading from the annular chamber between the casing and reduced portion, a rod extending through the column and connected to the stem for axial movement to depress the plunger and a ring rotatably connected to the rod above the steering wheel to rotate with the wheel and adapted to be depressed independently thereof for depressing the plunger to connect the inlet and outlet.

2. In an air pressure brake control for air pressure brakes, a control valve including a cylindrical casing having an inlet connection with a pressure supply line and an outlet connection leading to the brakes, a plunger movable in the casing and having a diametrical passage for connecting the inlet and outlet upon depression of the plunger and an elbow passage for connecting the outlet with the bottom of the casing, means in the bottom of the casing for holding the valve in the last named position, said casing having an exhaust at the bottom, a collar secured in the upper end of the cylinder and adapted for connection with the lower end of a steering gear assembly at the lower end of a steering wheel column, said plunger having a reduced stem movable through the collar and held against turning, an exhaust leading from the annular chamber between the casing and stem, a rod extending through the column and connected to the stem for axial movement to depress the plunger and means rotatably connected to the rod above the steering wheel to rotate with the wheel and adapted to be depressed independently thereof for depressing the plunger to connect the inlet and outlet.

3. In an air pressure brake control for air pressure brakes for automobiles having a depressible member at the steering wheel and column, an upright control valve including a cylindrical casing adapted to be connected to a pressure supply line and having inlet and outlet connections with said brakes, a plunger connected with the depressible member, said casing having an exhaust at the bottom, means for supporting the casing beneath the steering gear of the automobile, means at the bottom of the casing to normally hold said plunger in an exhaust position, said means being adjustable, means including a chamber above the plunger having an exhaust to relieve a dash pot above the plunger and within the casing, and means coacting between the plunger, casing and steering gear assembly to limit the movement of the plunger in either position.

4. In an air pressure brake control for air pressure operated brakes for use on automobiles having a steering column, a steering gear assembly and a rod adapted to be depressed at the top of the column and operating through the steering gear assembly, a control valve including an upright cylinder and a plunger snugly fitting and slidable in said cylinder and having a stem, said cylinder being detachably connected to the bottom of the steering gear housing, a pressure supply line having an inlet connection with said cylinder intermediately, said cylinder having an outlet for connection with the brakes and an L-shaped exhaust passage normally connected to the outlet for exhausting air from the brakes through the bottom of the plunger and cylinder, means for depressing the rod and plunger to connect the inlet and outlet, and pin and groove means coacting between the cylinder and stem to prevent rotation of the plunger and limit the movement thereof in either direction.

5. In an air pressure brake control for air pressure operated brakes, a control valve including a vertical cylinder adapted for connection with the bottom plate of a steering gear housing and having an inlet connected to a pressure supply line and an outlet for connection with the brakes, a cylindrical plunger in the cylinder having a diametrical passage and an L-shaped exhaust passage normally connected with the outlet for exhausting the air from the brakes while the inlet is closed, downwardly movable means extending through the steering gear housing for depressing the plunger to connect the inlet and outlet through the diametrical passage in the plunger of the valve while cutting off the exhaust and adjustable spring means normally and automatically holding said plunger with the inlet and outlet operatively disconnected and the outlet connected with the exhaust passage.

6. In an air pressure brake control for air pressure operated brakes, an upright control valve casing having inlet and outlet connections, a pressure supply line leading to the inlet connection, said outlet connection adapted to be connected with said brakes, a depressible plunger operating snugly in the casing and having an L-shaped exhaust extending axially thereof and from the bottom and through one side for alignment with the outlet connection to normally exhaust the air from the brakes and a diametrical passage thereabove for alignment with the inlet and outlet connections to supply air to the brakes when the plunger is depressed, said casing being connected at the bottom of a steering gear housing and means operating through said housing axially, connected to the plunger and controllable from a steering wheel and above the latter for depressing the plunger.

7. In an air pressure brake control for air pressure operated brakes, a control valve casing having inlet and outlet connections, a plunger operating in said casing, a pressure supply line leading to the inlet connection, said outlet connection adapted to be connected with said brakes, said casing having an exhaust extending from the bottom through one side for alignment with the outlet connection to normally exhaust the air from the brakes and a diametrical passage for alignment with the inlet and outlet connections to supply air to the brakes when the valve is depressed, said plunger having a stem connected to the lower end of a depressible rod in the steering wheel column at the steering gear housing, said stem having a slidable splined connection at the bottom of the housing, a shoulder to engage the upper end of said plunger to limit the upward movement of the plunger and an exhaust leading from the chamber between said plunger and casing and bottom of the housing to prevent the formation of a dash pot.

8. In an air pressure brake control for air pressure brakes, a control valve including an upright casing having a horizontal intermediate inlet connection at one side with a pressure supply line and a horizontal diametrically opposite intermediate outlet connection at the other side leading to the brakes, a normally elevated plunger movable in the casing and having a transverse horizontal diametrical passage for connecting the inlet and outlet upon depression of the plunger and an elbow passage therebelow extending through one side and the bottom of the plunger for connecting the outlet with the bottom of the casing, adjustable spring means in the bottom of the casing for holding the valve in the last named position, said casing having an exhaust at the bottom and operating means above a steering wheel for depressing the plunger through the column and steering gear assembly of an automobile at the lower end of a steering wheel column.

HAROLD HOLK.